United States Patent [19]

Riccitelli

[11] Patent Number: 4,585,087
[45] Date of Patent: Apr. 29, 1986

[54] MOTORCYCLE HAVING BELT DRIVE CONVERSION

[76] Inventor: Carl Riccitelli, 26 Whitney Ct., Hamden, Conn. 06518

[21] Appl. No.: 740,288

[22] Filed: Jun. 3, 1985

[51] Int. Cl.$^4$ ............... B62D 3/00; G05G 1/14
[52] U.S. Cl. .................... 180/230; 180/219; 180/231
[58] Field of Search ............ 180/219, 230, 231, 225, 180/336; 74/474, 512, 560

[56] References Cited

U.S. PATENT DOCUMENTS

| | | | |
|---|---|---|---|
| 3,884,316 | 5/1975 | Bowers | 180/230 |
| 3,919,896 | 11/1975 | Foster | 180/225 |
| 3,954,145 | 5/1976 | Nesbit | 180/230 |

Primary Examiner—John J. Love
Assistant Examiner—Donn McGiehan
Attorney, Agent, or Firm—McCormick, Paulding & Huber

[57] ABSTRACT

A motorcycle converted from a chain to a belt drive has a cogged drive pulley and a cogged clutch drum drivingly connected to each other by a cogged drive belt. A mounting bracket secured in fixed position to the motorcycle by fasteners which threadably engage existing threaded apertures in a stationary part of the motorcycle provides support for an elongated foot shift lever shaft and also carries a foot peg. A foot shift lever mounted on the foot shift lever shaft and the foot peg remain in stock positions after conversion.

7 Claims, 5 Drawing Figures

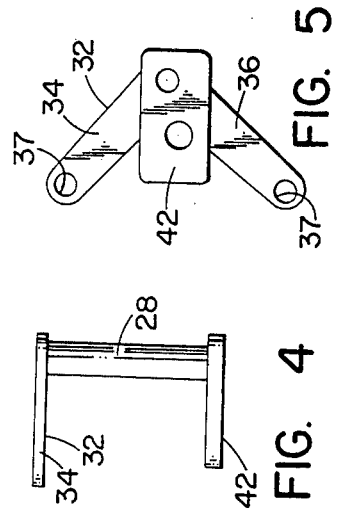
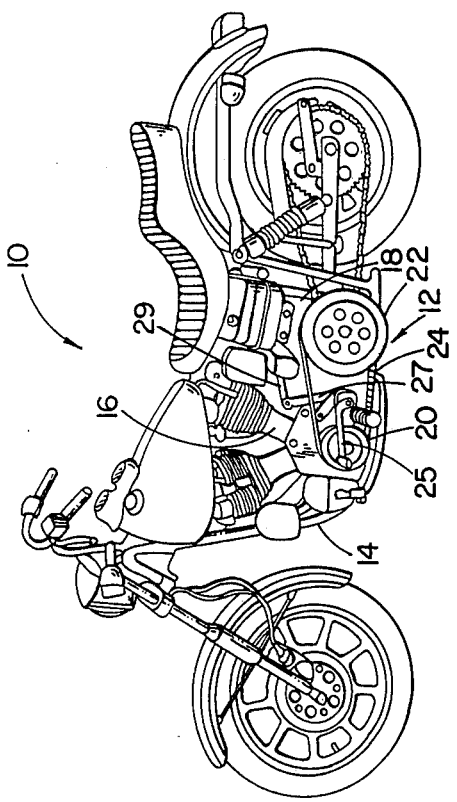
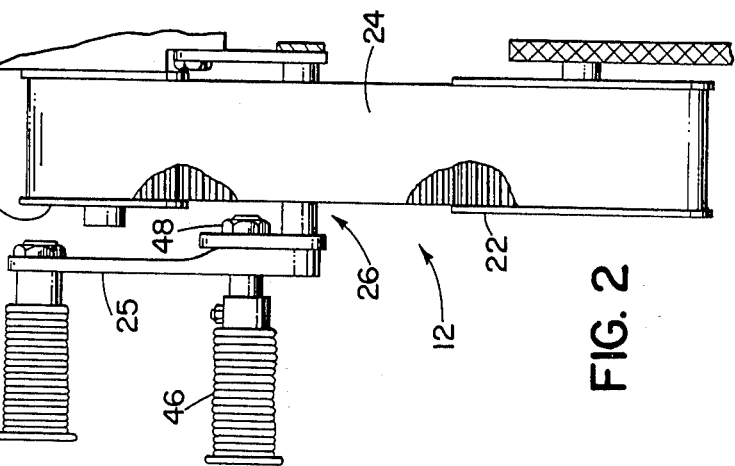
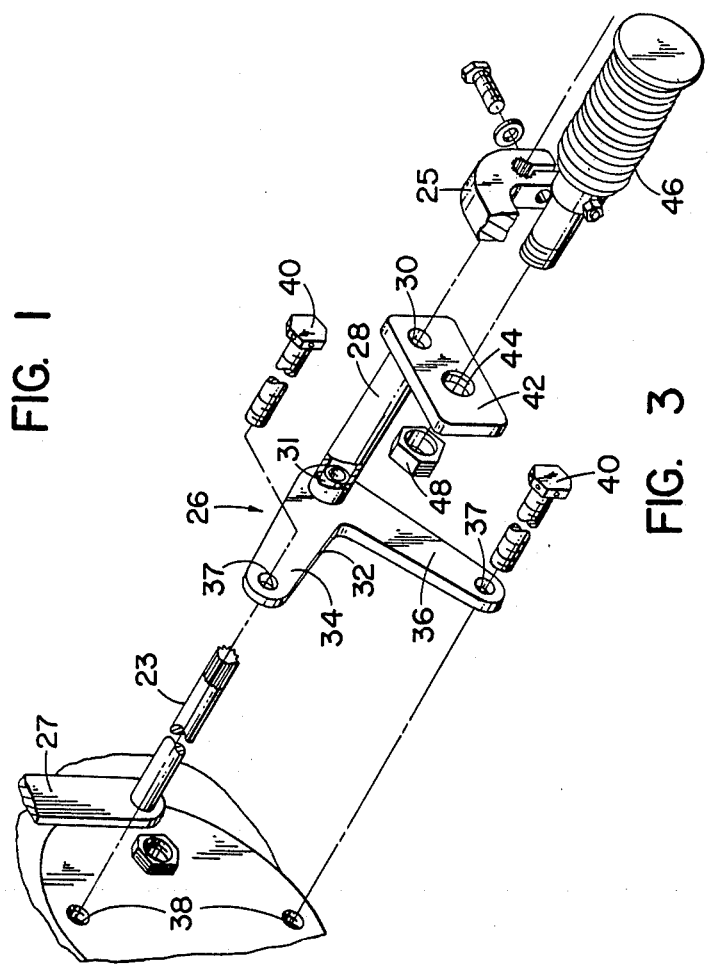

MOTORCYCLE HAVING BELT DRIVE CONVERSION

BACKGROUND OF THE INVENTION

This invention relates in general to motorcycles and deals more particularly with an improved belt drive conversion assembly for a motorcycle.

In recent years, it has become popular practice among motorcycle enthusiasts to convert stock motorcycle chain and sprocket drive mechanisms to belt drive mechanisms and numerous conversion kits have been provided for this purpose. A properly installed belt drive conversion kit reduces motorcycle weight by the elimination of heavy parts and also reduces vibration and increases effective power output. However, such conversion kits often require at least some modification of the basic motorcycle control system. It may, for example, be necessary to relocate the shift lever to accommodate belt conversion and, for example, in at least one popular conversion system the shift lever is moved from its stock position to another position near the highway peg. Many riders find this arrangement objectionable.

Accordingly, it is the general aim of the present invention to provide an improved motorcycle drive conversion unit wherein all control elements essential to riders comfort remain in stock position.

SUMMARY OF THE INVENTION

In accordance with the invention a stock motorcycle is modified to include a belt drive assembly. However, the motorcycle controls remain in stock position after modification. The modified motorcycle includes a frame and an engine mounted on the frame which has a rotary drive shaft projecting laterally outwardly from it. A transmission mounted in fixed position on the frame has a rotary transmission shaft which projects laterally outwardly from it in parallel relation to the drive shaft. A shift lever shaft is supported for rotary movement relative to the frame and projects laterally outwardly between the drive shaft and the transmisison shaft in generally parallel relation to the later shafts and carries a shift lever at its outer end. The motorcycle has an improved belt drive system which includes a cogged drive pulley mounted on the engine shaft for rotation with it and a cogged drum mounted on the transmission shaft for rotation with the later shaft. A cogged drive belt provides driving connection between the drive pulley and the drum. A means is provided for supporting the shift lever shaft substantially along its length and includes a mounting bracket assembly which has an elongated tubular member. The shift lever shaft extends through the bore of the tubular member and is supported at least near its opposite ends. A generally L-shaped bracket attaching member is mounted in fixed position to the inner end of the tubular member and has legs which extend radially outwardly relative to the axis of the tubular member. Apertures formed in the legs near the outer ends thereof are disposed in registry with existing threaded fastener receiving openings in a part of the motorcycle. The mounting bracket assembly also has a peg mounting member secured in fixed position to the outer end of its tubular member. The peg mounting member extends in a radially forward direction from the tubular member and has a peg mounting hole near its forward end for receiving the mounting portion of a foot peg therethrough. A means is provided for securing the peg to the mounting member. Threaded fasteners extend through the apertures and threadably engage the threaded openings in the part to secure the bracket in fixed position relative to the motorcycle.

BRIEF DESCRIPTION OF THE DRAWINGS

FIG. 1 is a side elevational view of a motorcycle having a belt drive conversion assembly embodying the present invention.

FIG. 2 is a fragmentary plan view of the belt drive conversion assembly.

FIG. 3 is an exploded fragmentary perspective view of the belt drive conversion assembly shown in FIG. 2.

FIG. 4 is a plan view of the foot shift lever mounting bracket.

FIG. 5 is a side elevational view of the foot shift lever mounting bracket.

DETAILED DESCRIPTION OF PREFERRED EMBODIMENT

In a stock motorcycle of the type with which the present invention is concerned a chain housing assembly which includes a chain housing mounted in fixed position relative to the motorcycle frame and a chain housing cover mounted on the chain housing provide an enclosure for a primary or front drive chain drivingly connected between a drive sprocket mounted on the drive shaft of the motorcycle engine and a driven sprocket which forms an integral part of a clutch associated with the motorcycle transmission and provides a non-slipping connection between the engine and the transmission. A rear chain driven by the motorcycle transmission drives a rear sprocket mounted on the rear wheel of the motorcycle. The chain housing and its cover also provide support for a foot shift lever shaft connected at its inner end through a linkage to a foot shifter mounted on the transmission gear box. At the outer end of the shift lever shaft there is mounted a foot shift lever, as will be hereinafter further discussed.

Turning now to the drawings and referring first particularly to FIG. 1, a modified motorcycle of the aforedescribed general type and indicated generally by the reference numeral 10 has a belt drive conversion assembly designated generally by the numeral 12. The illustrated motorcycle 10 has a frame 14 which supports an engine 16 and a transmission unit 18 which includes a gear box. The gear box contains a series of gears supported on a main shaft and a countershaft, but not shown. A gear shifter (not shown) mounted on the gear box includes shifting forks which slide gears into and out of mesh along the main shaft and countershaft in a selection of ratios according to speed and load requirements, in a manner well known in the motorcycle art.

In practicing the present invention, the chain housing cover is removed from the motorcycle and is not used. A cogged drive pulley 20, that is a pulley having cogged drive surface, has been substituted from the drive sprocket normally mounted on the engine drive shaft. The clutch drum provided with the stock motorcycle has been removed and replaced by a cogged clutch drum 22, that is a clutch drum having a cogged drive surface. A cogged belt 24 has been substituted for the chain and drivingly connects the drive pulley 20 and the clutch drum 22. The foot shift lever shaft, indicated by the numeral 23 and best shown in FIG. 3, has a splined outer end portion and carries a foot shift lever 25. Another lever 27 mounted on the inner end of the shaft is connected by a linkage 29 to the foot shifter on the gear box. The outer end portion of the shaft 23 is usually supported by a bearing carried by the chain housing cover which is not utilized in the present belt conversion system. However, a mounting bracket, designated generally by the numeral 26, is provided to perform this function.

Referring now particularly to FIGS. 3-5 the illustrated mounting bracket 26 essentially comprises an axially elongated tubular member 28 which has a coaxial bore 30 for receiving the foot shift lever shaft 23 therethrough. The bore 30 is or may be provided with bushings in its opposite ends. One such bushing is shown and indicated by the numeral 31 in FIG. 3. A generally L-shaped mounting member 32, welded or otherwise secured to the inner end of the tubular member, has a pair of legs 34 and 36 which extend radially outwardly therefrom. The end of each leg has aperture 37 therethrough disposed in registry with a threaded fastener receiving opening in the motorcycle. In the presently preferred embodiment the mounting bracket is secured to threaded openings 38, 38 in an existing part of the motorcycle such as the engine crank case by elongated fasteners 40, 40 which may replace somewhat shorter fasteners used to secure the crank case cover. At its outer end, the tubular member 28 carries a peg mounting member 42 which is welded or otherwise suitably secured to the tubular member 28 and extends in a forward radial direction from it. At its forward end the peg mounting member 42 has an aperture 44 which is or may be threaded to receive the threaded end of an associated foot peg such as indicated at 46 threaded therein and further secured by a locking nut 48, as shown in FIG. 2. The mounting bracket 26 provides support for the foot peg 46 in its normal or stock position and also provides the necessary support for the shift lever shaft 23 so that the foot shift lever 25 remains in its normal or stock position after the belt drive conversion has been completed.

I claim:

1. In combination with a motorcycle having a frame, an engine mounted on the frame and having a rotary drive shaft projecting laterally outwardly therefrom, a transmission mounted in fixed position on the frame and having a rotary transmission shaft projecting laterally outwardly therefrom in parallel relation to the drive shaft, a shift lever shaft supported for rotary movement relative to said frame and projecting laterally outwardly between the drive shaft and the transmission shaft in generally parallel relation thereto, a shift lever mounted on the outer end of said shift lever shaft, and a foot peg mounted in a stock position forward of said shift lever shaft, the improvement comprising a belt drive system including a cogged drive pulley mounted on the engine shaft for rotation therewith, a cogged drum mounted on the transmission shaft for rotation therewith, a cogged drive belt drivingly connecting said drive pulley to said drum, and means for supporting said shift lever shaft substantially along its length and including a mounting bracket assembly including an elongated tubular member having a coaxial bore receiving said shift lever shaft therethrough and supporting said shift lever shaft at least near its opposite ends, a generally L-shaped bracket attaching member mounted in fixed position to the inner end of said tubular member and having legs extending radially outwardly relative to the axis of said tubular member, said legs having apertures near the outer ends thereof in registry with existing threaded fastener receiving openings in a part of said motorcycle, said mounting bracket assembly having a peg mounting member secured in fixed position to the outer end of said tubular member and extending in a radially forward direction therefrom, said peg mounting member having a peg mounting hole near its forward end for receiving said peg therethrough, means for securing said peg to said peg mounting member, threaded fasteners extending through said apertures and threadably engaged within the threaded openings in said part and securing said brackets in fixed position relative to said motorcycle, said peg mounting member supporting said peg in its stock position.

2. The combination as set forth in claim 1 including bushings disposed in opposite ends of said bore, said shift lever shaft being journalled in said bushings.

3. The combination as set forth in claim 1 wherein said means for securing said peg comprises a thread on one end portion of said peg threadably engaged in said peg mounting hole.

4. The combination as set forth in claim 3 wherein said means for securing said peg comprises a lock nut threaded on said peg and engaged with said peg mounting member.

5. A foot shift lever mounting bracket assembly for a motorcycle having a stationary part defining a plurality of axially parallel threaded fastener receiving openings, an axially elongated foot shift lever shaft supported in axially fixed position relative to the stationary part for rotatable movement about its axis relative to the stationary part, and a foot shift lever mounted on the outer end of the foot shift lever shaft, said mounting bracket assembly comprising, an elongated tubular member having a coaxial bore for receiving said shift lever shaft therethrough and supporting said shift lever shaft at least near its opposite ends, a generally L-shaped bracket attaching member mounted in fixed position to the inner end of said tubular member and having legs extending radially outwardly relative to the axis of said tubular member, said legs having apertures near the outer ends thereof in registry with existing threaded fastener receiving openings in said stationary part, said mounting bracket assembly having a peg mounting member secured in fixed position to the outer end of said tubular member and extending in a radially direction therefrom, said mounting member having a peg mounting hole near its free end for receiving the mounting portion of a foot peg therethrough.

6. The combination as set forth in claim 5 including bushings disposed in opposite ends of said bore.

7. The combination as set forth in claim 5 wherein said peg mounting hole is internally threaded.

* * * * *